United States Patent [19]
Chang

[11] Patent Number: 6,012,338
[45] Date of Patent: Jan. 11, 2000

[54] ULTRASONIC FLOW VELOCITY MEASURING APPARATUS

[75] Inventor: Hak Soo Chang, Sungnam, Rep. of Korea

[73] Assignee: Chang Min Tech Co., Ltd., Sungnam, Rep. of Korea

[21] Appl. No.: 09/154,751

[22] Filed: Sep. 17, 1998

[30] Foreign Application Priority Data

Aug. 26, 1998 [KR] Rep. of Korea .................... 98-34534

[51] Int. Cl.$^7$ .................................................. G01F 1/66
[52] U.S. Cl. .................................. 73/861.27; 73/861.28; 73/861.18
[58] Field of Search .................. 73/861.23, 861.18, 73/861.25, 861.26, 861.27, 861.29, 861.31

[56] References Cited

U.S. PATENT DOCUMENTS

| | | | |
|---|---|---|---|
| 4,011,753 | 3/1977 | Hausler .................................. | 73/861.28 |
| 4,145,925 | 3/1979 | Stasz et al. ............................ | 73/861.25 |
| 4,185,498 | 1/1980 | Watson et al. ........................ | 73/861.27 |
| 4,203,322 | 5/1980 | Brown et al. ......................... | 73/861.27 |
| 4,262,545 | 4/1981 | Lamarche et al. ................... | 72/861.27 |
| 4,475,406 | 10/1984 | Ansaldi et al. ....................... | 73/861.29 |

Primary Examiner—Benjamin R. Fuller
Assistant Examiner—Jagdish Patel
Attorney, Agent, or Firm—Kile, McIntyre, Harbin & Lee; Eugene M. Lee

[57] ABSTRACT

An ultrasonic flow velocity measuring apparatus includes two transducers arranged to form a certain angle to a flow velocity direction to measure flow velocity of a fluid, the two transducers transmitting and receiving an ultrasonic beam relative to each other to allow ultrasonic beam transmitting time to be measured to compute the flow velocity, wherein the transducers are connected to a transducer switching portion, which is connected to an outputting amplifier, which is connected to a frequency modulation oscillator, which is connected to a one shot multivibrator, which is connected to a control square pulse generating portion, which is connected to the transducer switching portion and an output switching portion, the outputting switching portion is connected to the receiving amplifier, the an attenuator, and to the frequency discriminator, which is connected to a pulse shaping portion to shape the output of the frequency discriminator into a square pulse, the pulse shaping portion is connected to a time interval measuring portion, which is connected to a flow velocity arithmetic-logic processing unit to compute the flow velocity.

1 Claim, 4 Drawing Sheets

ULTRASONIC FLOW VELOCITY MEASURING APPARATUS

BACKGROUND OF THE INVENTION

The invention is related to a technology for measuring the flow velocity of fluid using an ultrasonic beam, and particularly, to an ultrasonic flow velocity measuring apparatus for measuring the flow velocity of a larger river or sluice open channel.

PRIOR ART

A conventional flowmeter is subject to measure the flow velocity using an ultrasonic beam on the crosssectional line of a larger calibration pipe or an open channel that fluid flows. Nowadays, the flow velocity is measured by an ultrasonic transmitting time difference method as follows:

$$V = \frac{\Delta t c^2}{2L\cos\varphi} = \frac{L^2}{2d} \cdot \frac{t_{21} - t_{12}}{t_{12} \cdot t_{21}}$$

Wherein, $\Delta t$ is equal to $t_{12}$ and $t_{21}$ are times that ultrasonic beam is transmitted in fluid at an angle $\phi$ or on the contrary to a flow velocity direction, L is an interval between two ultrasonic transducers, d is equal to $L\cos\phi$ and C is a sound velocity in fluid (called instead of an ultrasonic transmitting velocity below).

The flow velocity measuring method using the ultrasonic transmitting time difference is well-known, which is used by most of ultrasonic flowmeter. In other words, in order to measure the ultrasonic transmitting times $t_{12}$ and $t_{21}$, the time is measured from the ultrasonic transmitting moment to the receiving one. If the interval distance L between ultrasonic transducers is relatively longer, or various sizes of vortexes or eddies occur in the fluid flow, or the suspension concentration of fluid changes in a natural river, a sound pressure of an ultrasonic beam is severely pulsated at an ultrasonic receiving place because the ultrasonic beam is reflected or diffused, or the absorbing damping factor is changed.

Furthermore, even if an ideal ultrasonic beam having a short wave length is transmitted, the receiving signal becomes a bell-shaped pulse, because the higher harmonic component of the ultrasonic beam is severely damped. For it, a receiving error corresponding to a few periods of the ultrasonic beam usually happens in checking out the moment that the ultrasonic beam is received, and the receiving failure case is not quite less.

In order not to distort the shape of the received pulse in transmitting and receiving the ultrasonic beam, a wideband amplifier is used, but various noises are amplified. Especially, it causes the confusion in measuring the ultrasonic transmitting time due to the pulse noises.

As mentioned above, due to these factors in the larger calibration pipe, the larger river or sluice open channel, there were many cases that the ultrasonic transmitting times $t_{12}$ and $t_{21}$ had not been exactly measured at the receiving point. Also, a flowmeter for a pipe of a relative small calibration may cause an ultrasonic emitting transducer to be under the shock-excitation. At that time, the efficiency of converting Electricity into Ultrasonic Wave is deteriorated in a larger degree.

As a result, these problems make it difficult to measure the flow velocity using the ultrasonic transmitting time difference method in a manner that the ultrasonic beam is transmitted and received in the sluice open channel having a larger width and the river. The use of the ultrasonic flowmeter is limited.

In order to resolve these problems and advantages, an object of the invention is to provide an apparatus for measuring a flow velocity with an ultrasonic transmitting time difference method in which instead of an ultrasonic pulse continuous ultrasonic waves(Sine wave) are transmitted and received and their transmitting times are measured.

SUMMARY OF INVENTION

An ultrasonic flow velocity measuring apparatus comprises two transducers arranged to form a certain angle to a flow velocity direction in an section intended to measure the flow velocity. Two transducers are connected through a transducer switching portion to an outputting amplifier. The amplifier is connected to a frequency modulation oscillator for generating a continuous wave of a predetermined modulation frequency. The frequency modulation oscillator is connected to an one shot multivibrator for oscillating a given frequency pulse to operate the frequency modulation oscillator. The one shot multivibrator is connected to a control square pulse generating portion for enabling the one shot multivibrator to be operated at a given period as well as to control an outputting switching portion, in which the outputting amplifier amplifies the outputting signal from the frequency modulation oscillator to output it in turn to the transmitting transducers, the control square pulse generating portion is connected at one inputting terminal to a receiving amplifier, at the other inputting end to an attenuator for damping the outputting voltage of the outputting amplifier and at the outputting terminal to a frequency discriminator to detect the frequency modulation moment. The frequency discriminator is connected to a pulse shaping portion to shape its output into a square pulse. The pulse shaping portion is connected to a time interval measuring portion to measure a time difference between two pulses from the pulse shaping portion. The time interval measuring portion is connected to a flow velocity arithmetic-logic processing unit to compute a flow velocity.

BRIEF DESCRIPTION OF THE DRAWINGS

The invention now will be described in detail with reference to the accompanying drawings, in which.

DETAILED DESCRIPTION OF THE INVENTION

Figure 1:
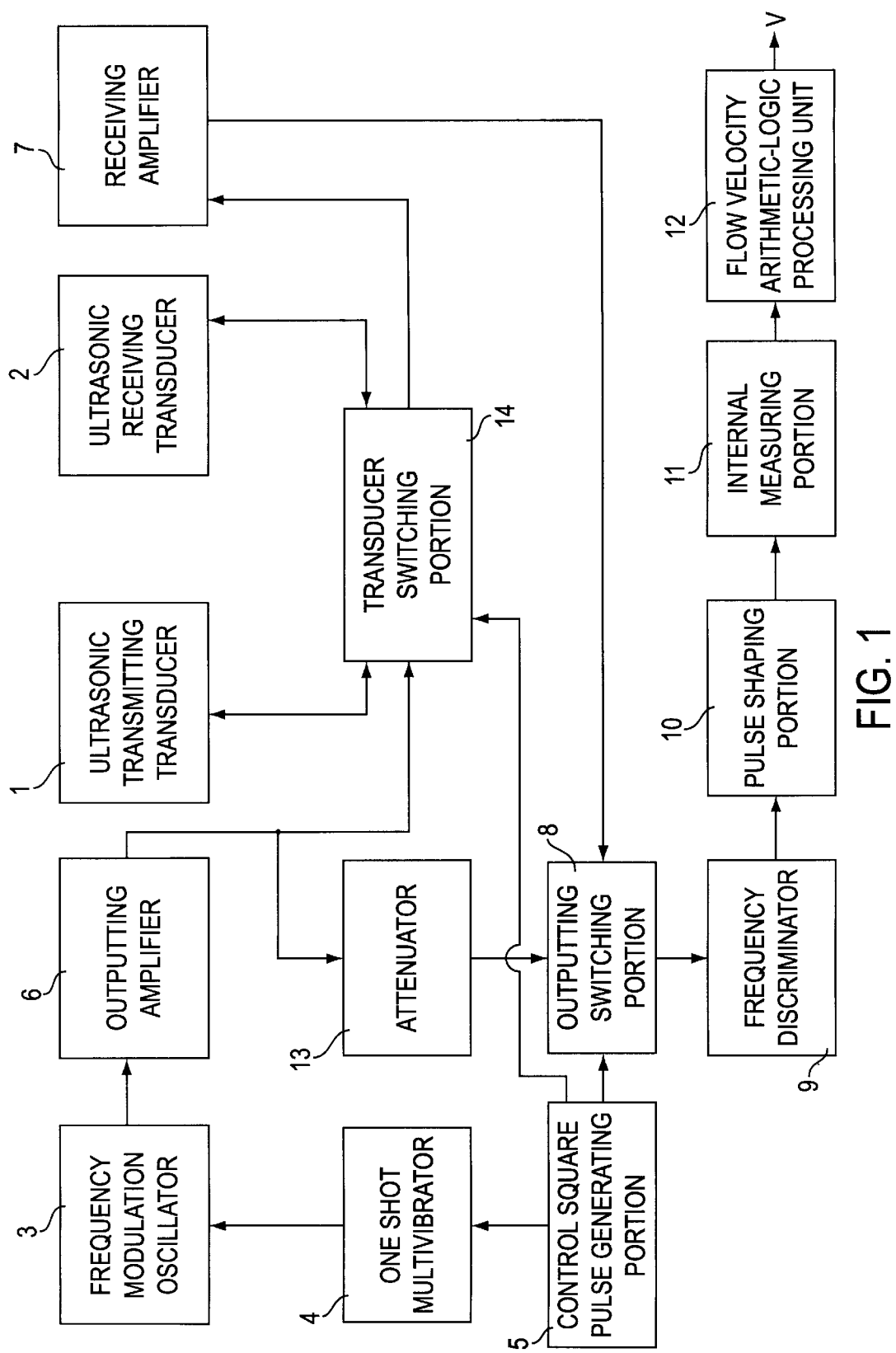
FIG. 1 is a block diagram illustrating an ultrasonic flow velocity measuring apparatus according to the invention.
Figure 2A:
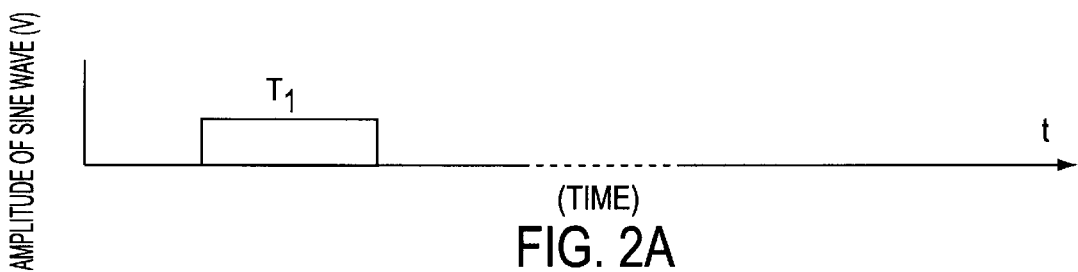
FIG. 2 is a diagram illustrating the operation of the ultrasonic flow velocity measuring apparatus according to the invention.
Figure 2B:
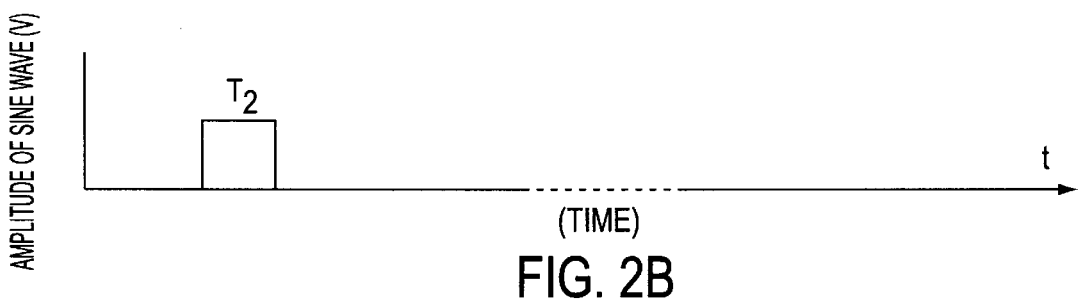
Figure 2C:
Figure 2D:
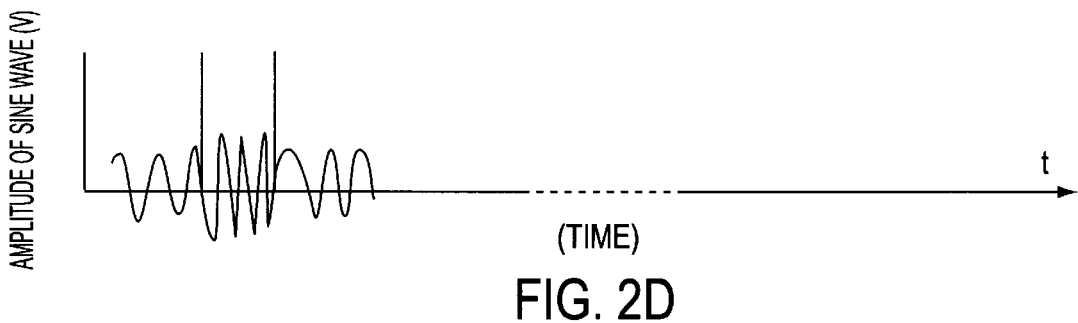
Figure 2E:
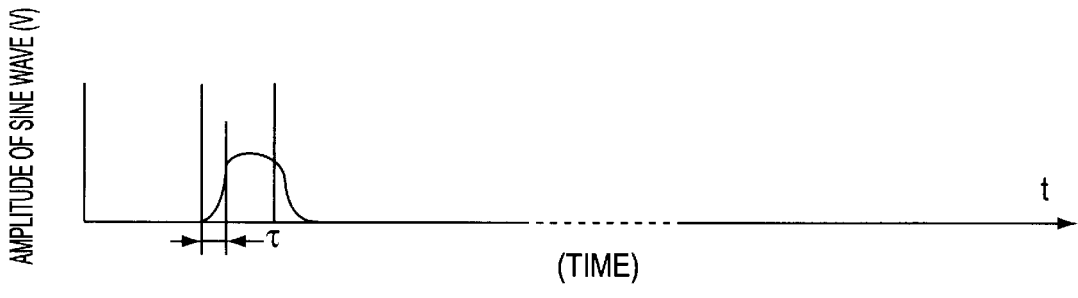
Figure 2F:
Figure 2G:
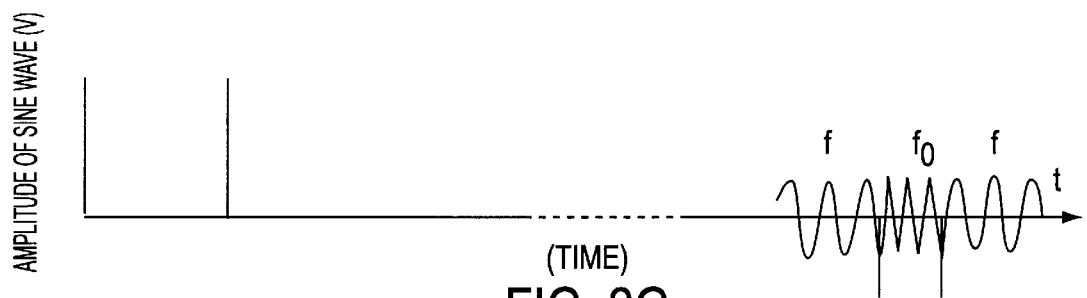
Figure 2H:
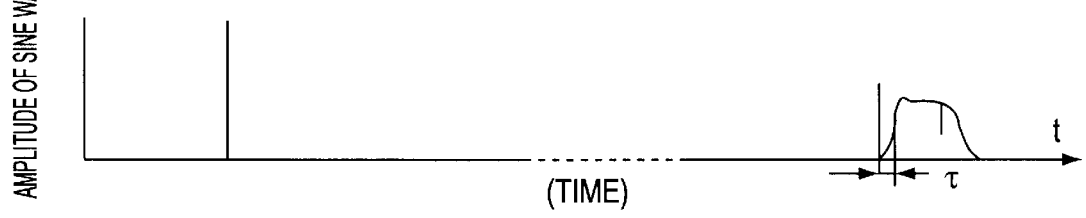
Figure 2I:
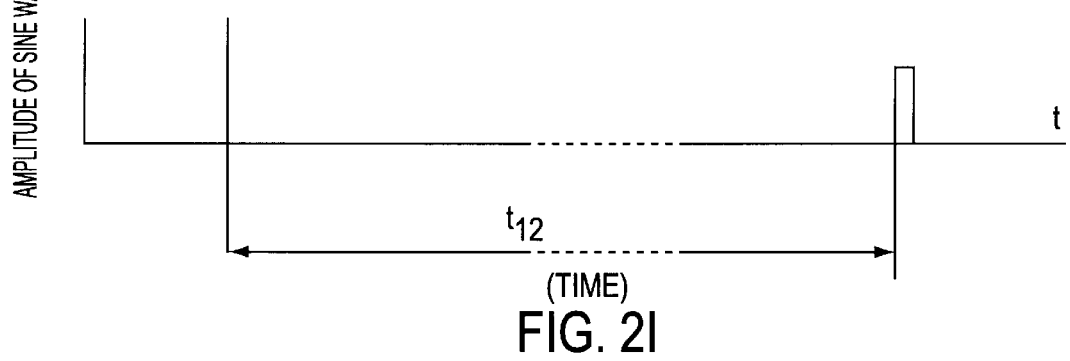

Referring to FIGS. 1 and 2, an ultrasonic transmitting transducer 1 and an ultrasonic receiving transducer are arranged to face against each other and electrically connected to a transducer switching portion 14 which is coupled to an outputting amplifier 6 and a receiving amplifier 7. Thus, in order to operate the ultrasonic transmitting transducer 1, the outputting amplifer is connected to a frequency modulation oscillator 3 for generating a continuous wave of a predetermined modulation frequency. The frequency modulation oscillator 3 is connected to a one shot multivibrator 4 for oscillating a given frequency pulse to apply it to the oscillator 3. The one shot multivibrator 4 is connected to a control square pulse generating portion 5 for enabling the one shot multivibrator 4 to be operated at a given period while to control an outputting switching portion 8. The outputting amplifier 6 amplifies the outputting signal from the frequency modulation oscillator 3 to output it to the transmitting transducer 1. An attenuator 13 is connected between the outputting amplifier 6 and the outputting switching portion 8 to damp the outputting voltage of the amplifier 6. The receiving amplifier 7 applies the amplified receiving signal through the outputting switching portion 8 to a frequency discriminator 9. A pulse shaping portion 10 receives the outputting voltage from the outputting switching portion 8 to shape it into the square pulse. A time interval measuring portion 11 measures a time difference between two pulses from the pulse shaping portion 10. A flow velocity arithmetic-logic processing unit 12 computes a flow velocity using an ultrasonic transmitting time difference method. An attenuator 13 is connected to the outputting switching portion 8.

The ultrasonic flow velocity measuring apparatus is operated as follows:

The control square pulse generating portion 5 generates a square shaped long pulse $T_1$ having a given period as shown in FIG. 2, A. The one shot multivibrator 4 operates at the leading edge of the square shaped long pulse $T_1$ to generate a square pulse having a period $T_2$ as shown in FIG. 2, B. The frequency modulation oscillator 3 generates a signal of an oscillating or sine frequency $f$, in which the oscillating frequency $f$ is changed into an oscillating frequency $f_0$ ($=f+\Delta f$) for the period $T_2$ of the square pulse and then returned to the sine frequency $f$ at the falling edge of the square pulse period $T_2$ as shown in FIG. 2, C, in which the frequency $f_0$ is a resonant one of transducers 1 and 2 and $\Delta f$ is a frequency deviation. Next, the frequency modulation oscillator 3 applies its output to the outputting amplifier 6, the outputting amplifier 6 amplifies the frequency modulated signal to apply it through the transducer switching portion 14 to the transmitting transducer 1. The transmitting transducer 1 transmits the ultrasonic beam in fluid as shown in FIG. 2, D. At the same time, the signal from the outputting amplifier 6 is inputted through the attenuator 13 and the outputting switching portion 8 into the frequency discriminator 9. Thus, the frequency discriminator 9 generates an outputting voltage for the frequency modulation period $\Delta f$ shown in FIG. 2, E. The signal voltage is inputted into the pulse shaping portion 10 to generate a pulse as shown in FIG. 2, F.

Thereafter, at the moment that the square shaped long pulse period $T_1$ reaches the trailing edge, the outputting switching portion 8 and the transducer switching portion 14 is switched to force a signal outputting from the receiving amplifier 7 to be inputted into the frequency discriminator 9. In other words, the ultrasonic beam from the transmitting transducer 1 is transmitted in fluid to the receiving transducer 2. The receiving transducer 2 operates at the receipt of the signal from the transmitting transducer 1 to apply its outputting signal to the receiving amplifier 7. The receiving amplifier 7 amplifies the receiving signal as shown in FIG. 2, G to apply it to the frequency discriminator 9. The frequency discriminator 9 generates the signal as shown in FIG. 2, H to operate the pulse shaping portion 10. The pulse shaping portion 10 generates a short pulse as shown in FIG. 2, I, in which the outputting signals (FIG. 2, E and H) of the frequency discriminator 9 are equal to each other and their delay times τ based on the transient phenomena becomes equal.

The time interval measuring portion 11 receives the short pulses of FIG. 2, F and I to measure a time interval $t_{12}$ therebetween, in which the short pulses are shaped from the outputting signal of the frequency discriminator 9 by the pulse shaping portion 10. The time interval measuring portion 11 inputs the time interval signal into the arithmetic-logic processing unit 12 to store it at the memory thereof. Herein, it is noted that $t_{12}$ is a time of forcing the ultrasonic beam to be transmitted from the transmitting transducer 1 to the receiving transducer 2.

When the measuring of the ultrasonic transmitting time from the transmitting transducer 1 to the receiving transducer 2 is finished, the transducer switching portion 14 is operated at the trailing edge of the pulse signal from the control square pulse generating portion 5 to force the receiving transducer 2 to transmit the ultrasonic beam to the transmitting transducer 1. Similarly, an ultrasonic transmitting time $t_{21}$ is measured to be inputted into the arithmetic-logic processing unit 12.

The arithmetic-logic processing unit 12 memorizes the distance interval L between two transducers and the distance $d(=L \cos \phi)$ previously set at the memory and computes the flow velocity V by the expression (1) with the results of the ultrasonic transmitting times $t_{12}$ and $t_{21}$. If it is intended to calculate a flow rate, the flow velocity value computed may be inputted into a flow rate computing apparatus.

Herein, it is noted that the efficiency of the transmitting transducer is increased three to five times as large as that at the case of using the ultrasonic pulse, because the ultrasonic pulse is not transmitted and the frequency modulated ultrasonic sinewave is used. The intensity of the ultrasonic beam also is raised. What is more important is to capture the moment that the receiving signal frequency is changed, not the fact that the amplitude of the receiving signal is captured to measure the ultrasonic transmitting time. And, the error caused due to the detecting delay time is removed, because one frequency discriminator detects the receiving and transmitting signals.

Therefore, even through the amplitude of the receiving signal is severely pulsated, the receiving signal is amplified, sufficiently. For example, the receiving signal is amplified up to a saturated state (that reaches the inputting allowable voltage of the frequency discriminator) to be able to be inputted into the frequency discriminator. It is easy to remove the noises using a band pass filter of the frequency $f_0 \sim f$, because the sinewave is continuously transmitted and received. It also removes the confusion that happens in measuring the ultrasonic transmitting time, because a wideband amplifier is used in order to prevent the distortion of the wave shape if the ultrasonic pulse is used.

Figure 3A:
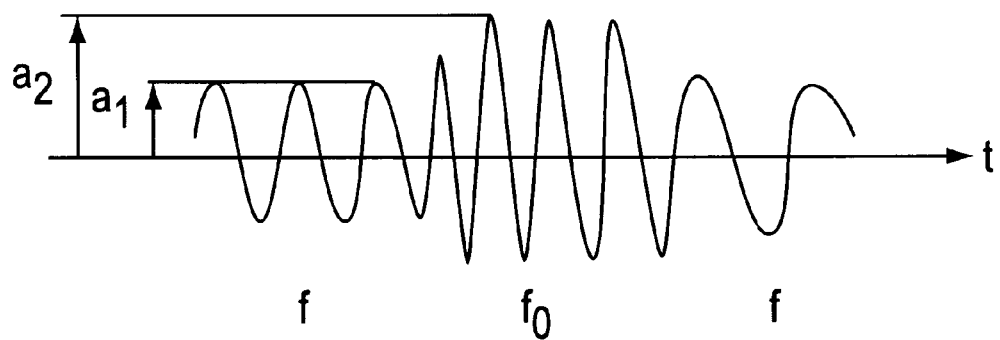
FIGS. 3A and 3B are views illustrating the frequency modulation of an ultrasonic beam.
Figure 3B:
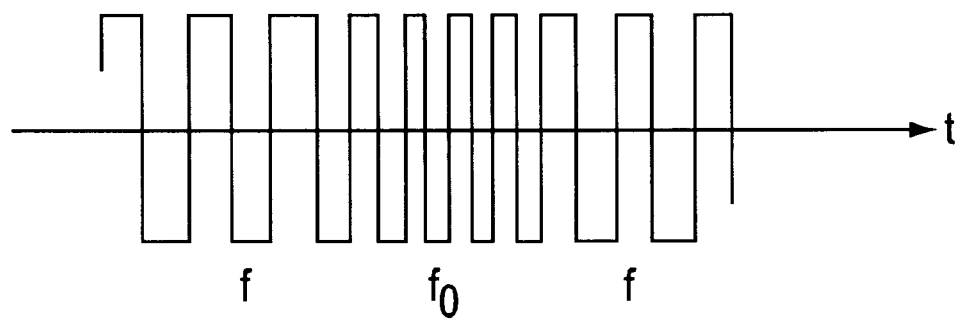

FIG. 3, A shows a wave shape of the outputting signal from a receiving transducer. A difference between an amplitude $a_2$ of a receiving signal at a resonant frequency $f_0$ and an amplitude $a_1$ of the receiving signal at a frequency $f(=f_0+\Delta f$ or $f_0-\Delta f)$ becomes larger much more, as the frequency deviation is increased. But, if the frequency $\Delta f/f_0$ is approximately equal to 0,1, the difference between the amplitudes $a_1$ and $a_2$ is not quit larger.

FIG.3, B shows a wave shape that a receiving signal is amplified up to a saturated state. The amplified signal can be inputted into a frequency discriminator. Of course, an amplitude of the signal amplified at a saturated state shall be equal to the maximum allowable inputting voltage of the frequency discriminator. And an attenuator 13 as shown in FIG. 1 functions to reduce the outputting voltage of an amplifier 6 to the maximum allowable inputting voltage of the frequency discriminator.

The invention ensures the ultrasonic receiving even if the interval distance L between two transducer is several hundreds of meters and the ultrasonic transmitting time measuring to increase the accuracy of a flow velocity even under condition that the sound pressure is severely pulsated at the ultrasonic receiving point due to many factors.

What is claimed is:

1. An ultrasonic flow velocity measuring apparatus including two transducers arranged to form a certain angle to a flow velocity direction in a section intended to measure the flow velocity, in which two transducers transmit and receive an ultrasonic beam in turn to each other to enable an ultrasonic transmitting time to be measured and then to compute a flow velocity, wherein:

two transducers are connected to a transducer switching portion, the transducer switching portion is connected to an outputting amplifier, the outputting amplifier is connected to a frequency modulation oscillator for generating a continuous wave of a predetermined modulation frequency, the frequency modulation oscillator is connected to a one shot multivibrator for oscillating a given frequency pulse to operate the frequency modulation oscillator, the one shot multivibrator is connected to a control square pulse generating portion to be operated at a given period, the control square pulse generating portion is connected to the transducer switching portion and an output switching portion for controlling a switching operation, the outputting amplifier amplifies an output signal from the frequency modulation oscillator, the transducer switching portion enables the output signal from the outputting amplifier to be inputted into any one of the transducers and then the output signal from the corresponding transducer to be inputted into a receiving amplifier, the outputting switching portion is connected to the receiving amplifier for switching the output signal from the receiving amplifier to apply to a frequency discriminator, the outputting switching portion is connected to an attenuator for damping an output voltage of the outputting amplifier, the outputting switching portion is connected to the frequency discriminator to detect a frequency modulation moment, the frequency discriminator is connected to a pulse shaping portion to share the output of the frequency discriminator into a square pulse, the pulse shaping portion is connected to a time interval measuring portion to measure a time difference between two pulses from the pulse shaping portion, and the time interval measuring portion is connected to a flow velocity arithmetic-logic processing unit to compute the flow velocity.

* * * * *